L. Brauer,
Manf. Extracts.
No. 100,849. Patented Mar. 15, 1870.
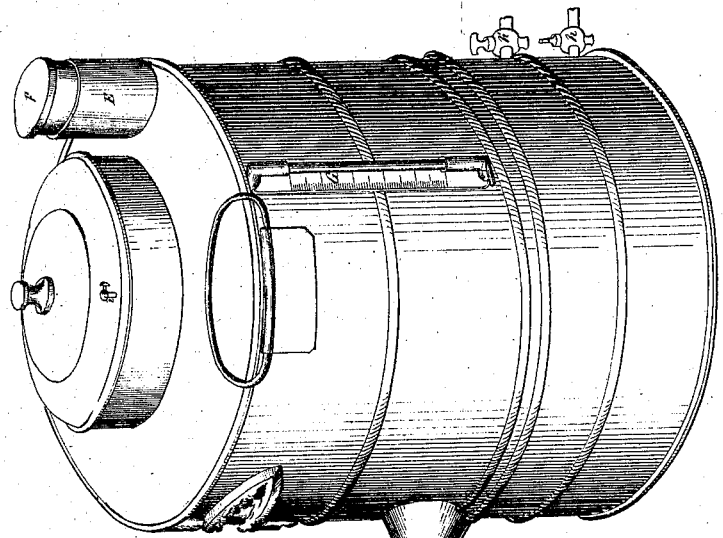
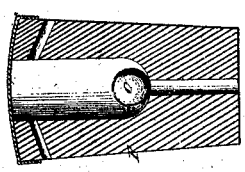
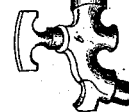
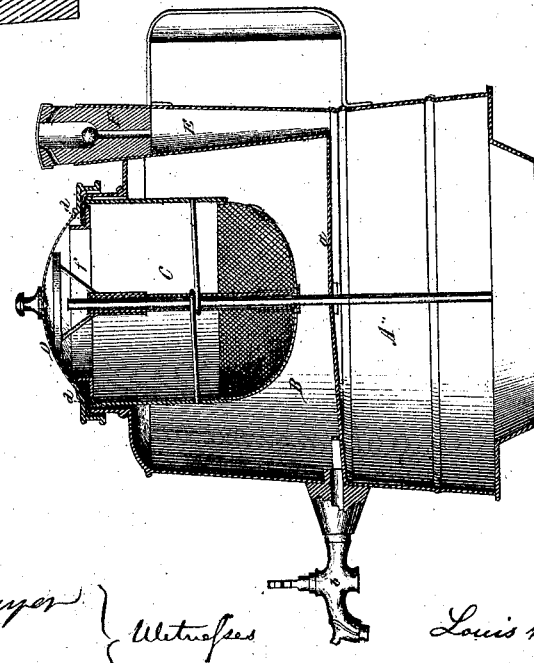

United States Patent Office.

LOUIS BRAUER, OF WASHINGTON, DISTRICT OF COLUMBIA.

Letters Patent No. 100,849, dated March 15, 1870.

IMPROVEMENT IN APPARATUS FOR MAKING EXTRACTS AND DECOCTIONS FROM COFFEE, TEA, AND OTHER SUBSTANCES.

The Schedule referred to in these Letters Patent and making part of the same.

*To all whom it may concern:*

Be it known that I, LOUIS BRAUER, of Washington city, in the county of Washington, and in the District of Columbia, have invented an Improvement in Apparatus for Making Extracts and Decoctions from Coffee, Tea, and other Substances; and I do hereby declare that the following is a full, clear, and exact description thereof.

This invention is an improvement on that for which Letters Patent were issued to me bearing date December 1, 1868, No. 84,609.

The improvements are as follows:

First, the two vessels or compartments which compose the apparatus are placed the one directly over the other, and are separated from each other by an inclined convex partition; the convex side of the partition being upward. The lower vessel, which contains the water or other liquid to be heated, is thus brought nearer the fire, and there is no danger of bringing the extract in the upper vessel above the boiling-point. This is important when it is necessary to keep coffee or other extracts warm for a long time, as in hotels and restaurants.

Second, the strainer or receptacle to contain the material to be treated reaches nearly to the bottom of the upper vessel, which keeps it partly immersed in the liquid till nearly the whole is drawn off. The bottom of the strainer or basket is made of wire-gauze, in the form shown, so as to give a larger straining surface.

Third, the funnel-shaped tube for filling the lower vessel is closed by a valve-stopper, which may be of any suitable material. This valve is an important addition.

Fourth, the top of the upper vessel is closed by a packed joint, so as to completely retain any essence or aroma that might escape, the cover being provided with a vent-cock to be opened while the extract is being made.

Fifth, the apparatus is provided with a gauge to one or both vessels.

Sixth, when it is not convenient to use fire heat, I provide steam-pipes or coils for heating the water in the lower vessel, or steam may be admitted directly into the lower vessel. By this arrangement it is not necessary to make the body of the apparatus of metal, as wood will answer. For making some kinds of extracts this is important.

I will describe my invention so that others may make and use the same.

Figure 1 shows a vertical sectional elevation of one form of my apparatus.

Figure 2 is a perspective view of the same, showing also the liquid-gauge and the connection for steam-pipes.

Figure 3 is a section of the valve-stopper.

The same letters represent like parts in all the figures.

The vessels A and B are separated by a partition, *a*, which is inclined toward the outlet-cock *b*, and is also made convex, as shown. The object of this is to draw off readily the whole of the extract in the vessel B.

The cage or strainer C may be made wholly of wire-gauze, or partly of gauze and sheet metal, as shown, or of perforated sheet metal. This receptacle or strainer is applied and operated as the corresponding part in my former patent mentioned above. The general operation and the general principles involved are also the same as in that patent, and therefore need not be particularly described.

The funnel-tube E for filling the vessel A is closed by means of a safety-valve stopper F, with ball-valve *e* and vent-holes, as shown in figs. 1 and 3.

The cover D is provided with a packing-ring or gasket, *d*, made of felt or other packing material, and held in place by a removable gland or flanged ring, *f*. By removing the gland *f* the packing may be taken out and cleaned.

The graduated gauge G and the mode of attaching it to the apparatus are shown in fig. 2, which also shows the steam-pipes *h h*, for admitting steam into the lower vessel A, or into steam-coils placed therein, for the purpose of heating up or for keeping the apparatus warm.

In the top of the cover D is placed a vent-cock, *i*, which must be opened while the liquid in the vessel A is being forced over into the vessel B, unless the joint between the cover and the vessel B is only loosely packed.

This apparatus is well adapted for making all kinds of extracts in the making of which heat is required.

The water used is necessarily always at the boiling point, and never above it. The extract may be kept at this temperature for any length of time, and is not boiled, wasted, or evaporated. This gives my invention a special application to tea and coffee-pots, which may be made in the usual forms but with the addition of the improvements herein named.

For making extracts from barks, plants, malt, hops, and other materials, the proper solvent for the extract to be made being placed in the vessel A and forced by the pressure of steam therein to pass by means of a connecting pipe, as shown, through the material, and thence into the vessel B, to be drawn off as extract when wanted.

The vessel B may be divided into two or more compartments, so as to make extracts from different substances at the same time.

Having thus described my invention,
What I claim, and desire to secure by Letters Patent of the United States, is—

1. The apparatus herein described, composed of a lower and an upper vessel, separated by a partition and connected by a pipe, as described.

2. A valve-stopper such as herein described, applied as and for the purpose set forth.

3. The strainer C, as described, in combination with the vessel B.

4. The cover D, with removable packing, as described.

5. The combination of one or more gauges G with vessels A and B, as shown and described.

6. The combination of steam-pipes or coils with the vessel A, as described.

7. The vent-cock $i$, in combination with the cover D, so as to relieve the pressure in vessel B, as described.

The above specification signed by me this 3d day of March, 1870.

LOUIS BRAUER.

Witnesses:
PHILETUS SAWYER,
JNO. D. PATTEN.